Figure 1A:
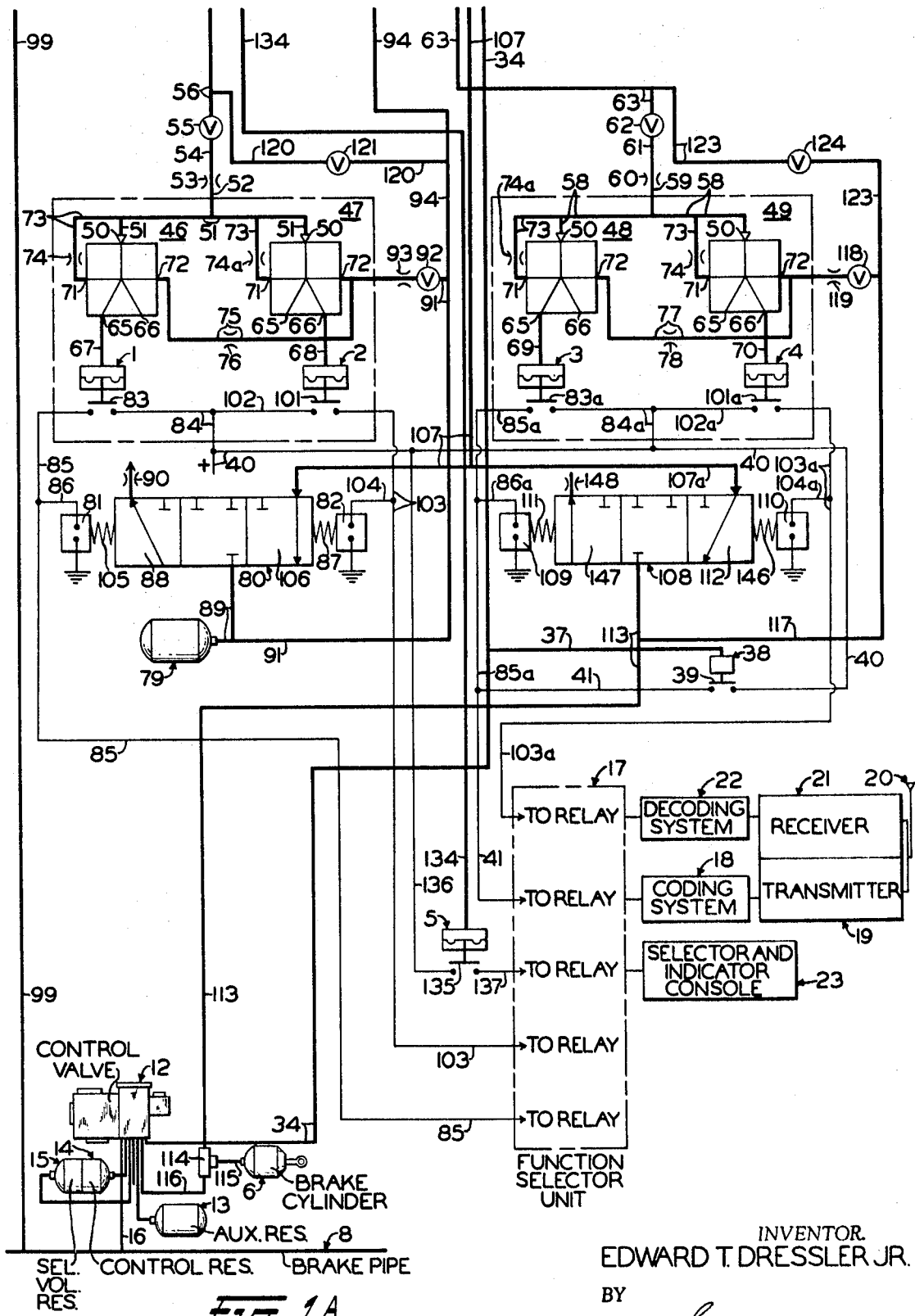

United States Patent

[11] 3,583,771

| [72] | Inventor | Edward T. Dressler, Jr.<br>Essex, Md. |
|---|---|---|
| [21] | Appl. No | 854,573 |
| [22] | Filed | Sept. 2, 1969 |
| [45] | Patented | June 8, 1971 |
| [73] | Assignee | Westinghouse Air Brake Company<br>Wilmerding, Pa. |

[54] LOCOMOTIVE BRAKE CONTROL APPARATUS SUITED FOR REMOTE MULTIPLE-UNIT OPERATION
10 Claims, 2 Drawing Figs.

[52] U.S. Cl. ..................................................... 303/20, 105/61, 303/15
[51] Int. Cl. ..................................................... B60t 13/68, B60t 13/70
[50] Field of Search ......................................... 105/61; 246/182; 303/20, 25

[56] References Cited
UNITED STATES PATENTS

| 3,158,409 | 11/1964 | Hughson et al. | 303/15 |
| 3,374,035 | 3/1968 | Howard | 303/20 |
| 3,384,033 | 5/1968 | Ruff | 105/61 |
| 3,402,972 | 9/1968 | Cooper et al. | 303/20 |
| 3,476,442 | 11/1969 | Sarbach | 303/19 |

OTHER REFERENCES
" Slave Units Alter Techniques of Train Handling," Railway Locomotives And Cars, October 1967, pp. 25— 27.

*Primary Examiner*—Milton Buchler
*Assistant Examiner*—Stephen G. Kunin
*Attorneys*—Adelbert A. Steinmiller and Ralph W. McIntire, Jr.

ABSTRACT: Brake control apparatus for the lead locomotive of a multiple-unit locomotive control system wherein the brake valve on the lead locomotive is manually operable conventionally to control application and release of the brakes on the forward portion of the train from the lead locomotive and also to effect corresponding control (via radio-transmitted signals initiated by manual operation of the brake valve on the lead locomotive) of the brakes on the remaining portion of the train from the brake valve on a slave locomotive remotely located in the train. Switch devices selectively operated by a plurality of pure fluid devices in correspondence to the respective operation of either the automatic or the independent brake valves on the lead locomotive establish suitable control circuitry to solenoid-operated valves so as to cause either the charging of and subsequent reduction of pressure in an equalizing reservoir on the lead locomotive in automatic brake operation or the supply of fluid under pressure to or the release of fluid under pressure from a brake cylinder on the lead locomotive in independent straight airbrake operation. This same circuitry also controls radio transmission of appropriate brake control signals from the lead locomotive to the slave locomotive so as to cause a reduction of equalizing reservoir pressure on the slave locomotive in correspondence with that on the lead locomotive, thereby initiating a service application of the brakes on that portion of the train coupled to the slave locomotive concurrently with that initiated at the lead locomotive, or to cause independent application and release of the brakes on the slave locomotive.

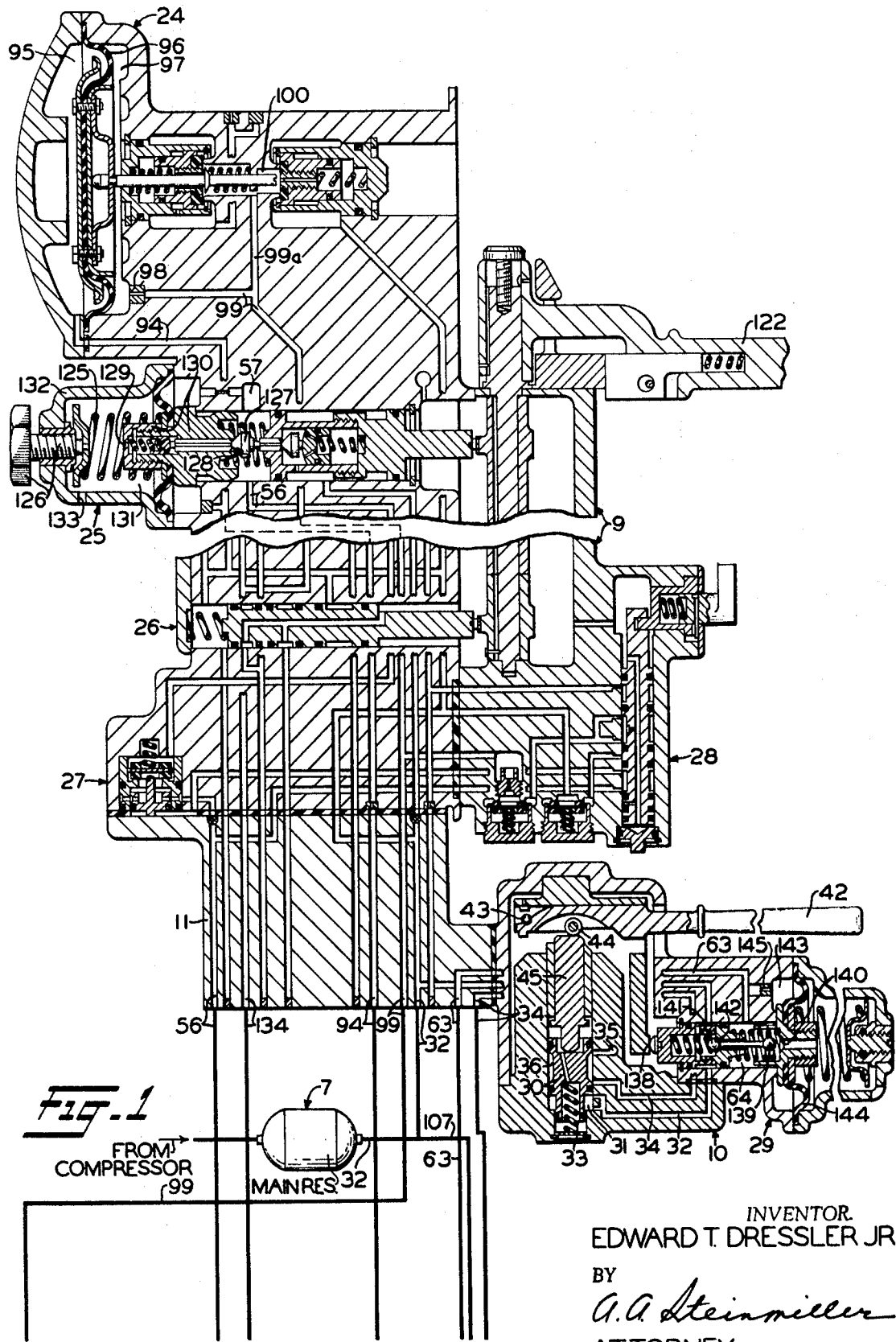

INVENTOR.
EDWARD T. DRESSLER JR.
BY
ATTORNEY

LOCOMOTIVE BRAKE CONTROL APPARATUS SUITED FOR REMOTE MULTIPLE-UNIT OPERATION

BACKGROUND OF THE INVENTION

There are presently in use on some American railroads so-called RMU (remote multiple unit) brake control systems capable of effecting, via radio-communicated signals, simultaneous operation of brake controls on a slave locomotive located intermediate the length of a train by operation of the brake controls on the lead locomotive. In one such brake control system, the lead locomotive is provided, in addition to the usual engineer's brake valve, with a manually operated pushbutton-type brake control console the manual operation of which simultaneously effects electropneumatic control of pressure in an equalizing reservoir and the brake pipe on the lead locomotive and also, via radio-communicated signals, control of pressure in an equalizing reservoir and the brake pipe on the slave locomotive, whereby operation of the brake equipment on those cars located between the slave locomotive and the end of the train occurs substantially simultaneously with operation of the brake equipment on those cars located intermediate the lead and slave locomotives. The additional control equipment to insure that a locomotive is adaptable for use as the lead locomotive in RMU operation represents not only additional equipment cost but additional difficulties in servicing and maintaining the equipment.

Accordingly, it is the purpose of this invention to provide a locomotive control equipment suitable for use on the lead locomotive in RMU operation without the additional separate control equipment including a manually operated pushbutton-type brake control console.

SUMMARY OF INVENTION

According to the present invention, a novel locomotive brake control equipment suited for RMU operation is provided, in which the conventional automatic and independent brake valves are employed by RMU operation, that is for control of the brakes on the lead locomotive and on the slave locomotive in the same train, without the addition of a separate pushbutton-type brake control console. This is made possible by the provision of a plurality of fluid pressure switches the operation of which is controlled by a corresponding number of pure fluid devices operable selectively in accordance with manual operation of the handle of either the automatic or independent brake valve to its various brake control positions, in which the respective brake valve functions in its normal manner to control the pressure in either the equalizing reservoir or in the brake cylinder on the lead locomotive for brake control purposes and at the same time, via radio-communicated signals initiated by operation thereof, effect similar variation of the pressure in either the equalizing reservoir in the brake cylinder on the slave locomotive for respectively, corresponding simultaneous brake control on that portion of the train coupled to the slave locomotive, or control of the brakes on the slave locomotive only.

In the accompanying drawings:

FIG. 1 and FIG. 1A, when taken together such that the lower edge of FIG. 1 is matched with the upper edge of FIG. 1A, constitute a diagrammatic view of the brake control equipment embodying the invention employed on a locomotive when it is used as the lead locomotive in RMU operation.

As shown in the drawings, the conventional brake control equipment heretofore provided on a locomotive when it is used as the lead locomotive in remote multiple-unit operation is modified by the provision of five fluid pressure operated switches 1, 2, 3, 4 and 5 and the elimination of the heretofore known and used manually operable brake control console.

The brake control equipment constituting the present invention further comprises, for pneumatically controlling the brakes on the lead locomotive, a brake cylinder 6, a plurality of reservoirs including a main reservoir 7, a brake pipe 8 that extends from end to end of the locomotive and at one end is coupled to the train brake pipe by the usual hose and hose couplings, an engineer's automatic brake valve 9 operative to control the pressure in the brake pipe 8, an independent brake valve 10 that is secured to a pipe bracket 11 of the automatic brake valve 9 by any suitable means (not shown) for controlling the brakes on the locomotives independently of the brakes on the cars in the train, and a fluid pressure brake control valve 12, together with an auxiliary reservoir 13, a control reservoir 14 which is combined with a selector volume reservoir 15 into a two-compartment reservoir. The brake control valve 12 is connected by a branch pipe 16 to the brake pipe 8.

In order to effect operation of the brake equipment on a slave locomotive via radio signals transmitted thereto from the lead locomotive, the brake control equipment embodying the present invention further includes a function selector unit 17 having a plurality of electrical relays, the pickup circuits of five of which are controlled respectively by the five hereinbefore-mentioned fluid pressure operated switches 1, 2, 3, 4 and 5, a coding system 18 for receiving the output information of the function selector unit 17 and preparing this information for transmittal to a slave locomotive or locomotives via a radio transmitter 19 having an antenna 20. This brake equipment on the lead locomotive further comprises a radio receiver 21 for receiving via antenna 20 information in the form of radio signals transmitted from the slave locomotive regarding the status of this locomotive, and converting these radio signals to electrical inputs which are fed to a decoding system 22 that in turn transmits the information regarding the slave locomotive or locomotives to the function selector unit 17 which coordinates this information and furnishes it to a selector and indicator console 23 for display.

The engineer's automatic brake valve 9 and the independent brake valve 10 are both secured to the pipe bracket 11 and thus constitute a No. 26–C type of self-lapping brake valve manufactured by the Westinghouse Air Brake Division of Westinghouse Air Brake Company, a subsidiary of American Standard, Inc.

The automatic brake valve 9 comprises a relay valve 24, a self-lapping regulating or control valve 25, a suppression valve 26, an equalizing reservoir cutoff valve 27, a manually positionable selector valve 28 for selectively conditioning the automatic brake valve 9 for effecting either direct-release operation of the brake control valve on each car in a train of cars hauled by a locomotive provided with this automatic brake valve 9, if each car is provided with a direct-release type brake control valve, or graduated application and graduated-release operation of the brake control valve on each car if each car is provided with a graduated-release type control valve, for cutting out control of brake pipe pressure by the brake valve 9 for remote multiple-unit or trailing (pusher) unit operation, or for conducting a brake pipe leakage test, a vent valve, an emergency valve and a brake pipe cutoff valve, the latter three not being shown in the drawings since they form no part of the present invention.

The independent brake valve 10 comprises a self-lapping valve unit 29 which may be of any standard construction and therefore, will not be described in detail herein. The independent brake valve 10 further comprises a differential area piston-type independent release valve 30, reciprocal in a direction at right angles to the axis of the self-lapping valve unit 29. This release valve 30 has small and large diameter ends which are exposed to atmospheric pressure and has therebetween an annular chamber 31 which is constantly open to the main reservoir 7 via a passageway and corresponding pipe 32. A bias spring 33 acting on the small end of the release valve 30 and assisted by main reservoir pressure in the annular chamber 31 urges the release valve 30 to a normal position in which it is shown in FIG. 1. In this position, an actuating passageway 34 is connected to an atmospheric vent port 35 by a peripheral annular groove 36 formed on the release valve 30. This actuating passageway 34 is connected by a correspondingly numbered pipe to the release selector valve portion of the quick-release valve device which constitutes a part of the hereinbefore-mentioned brake control valve 12 comprising a part of the brake control equipment on the lead locomotive to provide for effecting an independent release of an automatic brake application on this locomotive.

In order to provide for substantially simultaneously effecting transmission of the independent brake release command signal to the slave locomotive, to effect a release of the brakes only on this locomotive subsequent to the engineer effecting a brake application on all the locomotives and cars in the train by use of the automatic brake valve 9 on the lead locomotive, one end of a pipe 37 is connected to the pipe 34 intermediate the ends thereof and the opposite end is connected to a fluid pressure operated switch 38. In the closed position of normally open contact 39 of switch 38, a circuit is established between a power supply wire 40 and a wire 41 that is connected to an independent quick-release relay (not shown) in the function selector unit 17 to cause energization or pickup of this relay. Whenever this relay is thus picked up, transmission of the independent brake release command signal to the slave locomotive is made via radio-transmitted signals effected by operation of the coding system 18, transmitter 19 and antenna 20.

The independent brake valve 10 is provided with an operating handle 42 which is hinged on a pin 43 and which also carries a roller 44 that, upon manual depression of the handle 42 to rock it about the pin 43, acts through a pusher stem 45 to shift release valve 30 to an independent brake release position against the force of the spring 33 and fluid under pressure from the main reservoir 7 acting in the annular chamber 31. In this depressed position, the peripheral annular groove 36 connects the main reservoir passageway 32 to the actuating passageway and pipe 34 for charging the latter to effect an independent release of the brakes on all the locomotives in the train in a manner hereinafter described.

In order to control operation of the fluid pressure operated switches 1 and 2, the novel brake control equipment on the lead locomotive includes a first fluid-sensing circuit which comprises two bistable fluid amplifiers 46 and 47 operable sequentially in response to manual operation of the automatic brake valve 9 to effect the supply of fluid under pressure to these switches 1 and 2.

Likewise, in order to control operation of the fluid pressure operated switches 3 and 4, this novel brake control equipment further includes a second fluid-sensing circuit which comprises two bistable fluid amplifiers 48 and 49 operable sequentially in response to manual operation of the independent brake valve 10 to effect the supply of fluid under pressure to these switches 3 and 4.

Since the bistable fluid amplifiers 46, 47, 48 and 49 are identical, a description of one will suffice for all, it being understood that the corresponding parts of each are denoted by the same reference numeral.

Each of the bistable fluid amplifiers 46, 47, 48 and 49 is provided with a supply port 50. The supply ports 50 of the fluid amplifiers 46 and 47 are connected by a pipe 51 to which is connected intermediate the ends thereof one end of a short pipe 52 that has its opposite end connected to the outlet of a choke 53 whereby this choke provides a low-pressure fluidic supply of fluid pressure to the fluid amplifiers 46 and 47. Connected to the inlet of choke 53 is one end of a pipe 54 that at its opposite end is connected to the outlet of a normally open manually operable shutoff valve 55. The inlet of valve 55 is connected by a pipe and corresponding passageway 56 that extends through the equalizing reservoir cutoff valve 27 of automatic brake valve 9 while it is in its open position, and opens into a delivery chamber 57 in the control valve 25.

The supply ports 50 of the fluid amplifiers 48 and 49 are connected by a pipe 58 to which is connected intermediate the ends thereof one end of a short pipe 59 that has its opposite end connected to the outlet of a second choke 60 whereby this choke provides a low-pressure fluidic supply of fluid pressure to the fluid amplifiers 48 and 49. Connected to the inlet of choke 60 is one end of a pipe 61 that at its opposite end is connected to the outlet of a normally open manually operable shutoff valve 62. The inlet of valve 62 is connected by a pipe and corresponding passageway 63 that opens into a delivery chamber 64 in the self-lapping valve unit 29 of independent brake valve 10.

Each of the fluid amplifiers 46, 47, 48 and 49 further comprises a pair of outputs 65 and 66 which is connected as follows:

Output 65 of fluid amplifier 46 is connected by a pipe 67 to the fluid pressure operated switch 1 and the output 66 of this amplifier is open to atmosphere.

Output 65 of fluid amplifier 47 is open to atmosphere and output 66 of this amplifier is connected by a pipe 68 to the switch 2.

Output 65 of fluid amplifier 48 is connected by a pipe 69 to the switch 3 and the output 66 of this amplifier is open to atmosphere.

Output 65 of fluid amplifier 49 is open to atmosphere and output 66 of this amplifier is connected by a pipe 70 to switch 4.

Furthermore, each of the fluid amplifiers 46, 47, 48 and 49 is provided with a pair of control inputs 71 and 72 which, when selectively pressurized, effect pressurization of the corresponding outputs 66, 65 respectively. By virtue of inherent memory, the bistable fluid amplifiers 46, 47, 48 and 49 will maintain the pressurized output in a pressurized condition even though the actuating one of the control inputs is thereafter depressurized, and until the other one of the control inputs is pressurized.

The control input 71 of each of the fluid amplifiers 46 and 47 is connected to the pipe 51 by a pipe 73. The pipe 73 leading to the control input 71 of amplifier 46 has disposed therein a choke 74 which insures that the pressure of the control fluid supplied to the control input 71 is less than the pressure of the fluid delivered to the supply port 50. The pipe 73 leading to the control input 71 of amplifier 47 has disposed therein a choke 74a the size of which is less than that of the choke 74. Likewise, the control inputs 71 of the fluid amplifiers 48 and 49 are connected to the pipe 58 by pipes 73 having respectively disposed therein chokes 74a and 74.

The inputs 72 of the fluid amplifiers 46 and 47 are connected by a pipe 75 having a choke 76 therein. The inputs 72 of the fluid amplifiers 48 and 49 are likewise connected by a pipe 77 having a choke 78 therein the purpose of the chokes 76 and 78 being to provide for operation or switching of fluid amplifiers 46 and 48 at a pressure that is less than the pressure at which the fluid amplifiers 47 and 49 operate or switch.

For controlling the supply and release of fluid under pressure to and from an equalizing reservoir 79 provided on the lead locomotive, the brake control equipment constituting the present invention further comprises a double-solenoid-operated double-spring-returned spool valve device 80 of any commercially available type having a pair of solenoid-actuating coils 81 and 82.

In the closed position of the switch 1 its normally open contact 83 establishes a circuit between a wire 84 that is connected to the hereinbefore-mentioned power supply wire 40 and a wire 85 that is connected to an automatic brake application relay (not shown) in the function selector unit 17 to cause energization or pickup of this relay. Whenever this relay is thus picked up, transmission of the automatic brake application command signal to the slave locomotive is made via radio-transmitted signals effected by operation of the coding system 18, transmitter 19 and antenna 20.

A wire 86 has one end connected to the wire 85 intermediate the ends thereof and the opposite end connected to one end of the solenoid-actuating coil 81 of the spool valve 80 the opposite end of this coil being connected to ground as shown in the drawing. Consequently, the solenoid-actuating coil 81 is energized simultaneously as the automatic brake application relay in the function selector unit 17 is picked up. Upon energization of the solenoid-actuating coil 81, the spool valve 80 is moved against the yielding resistance of a first spring 87 to a position denoted in the drawings by the numeral 88 in which one end of pipe 89, that at its opposite end is connected to the equalizing reservoir 79, is connected through the spool valve 80 to a service exhaust choke 90 that is open to atmosphere. A pipe 91 having a normally open manually operable shutoff valve 92 and a choke 93 disposed in series therein has one and connected to the pipe 89 intermediate the ends thereof and the opposite end connected to the pipe 75 on the right-hand side of the choke 76 in order that the fluid under pressure supplied to the equalizing reservoir 79 by the spool valve 80 in a manner hereinafter described may flow to the control inputs 72 of the bistable fluid amplifiers 46 and 47 to pressurize the respective outputs 65 and depressurize the respective outputs 66 to cause the fluid amplifiers 46 and 47 to assume one of their two bistable states. It will be understood that the purpose of the choke 93 is to provide a low-pressure fluidic supply of fluid pressure to the control inputs 72 of the fluid amplifiers 46 and 47.

Connected to the pipe 91 on the right-hand side of the shutoff valve 92 is one end of a pipe 94 the opposite end of which is connected to a corresponding passageway in the automatic brake valve 9 which passageway opens into a chamber 95 at the left-hand side of a diaphragm 96 of the relay valve 24, it being understood that this chamber 95 is always charged to the pressure in the equalizing reservoir 79.

A chamber 97 at the right-hand side of the diaphragm 96 is connected to the hereinbefore-mentioned brake pipe 8 via a choke 98 and a passageway and corresponding pipe 99. A branch 99a of the passageway 99 opens into the delivery chamber 100 of the relay valve 24. Consequently, the chamber 97 at the right-hand side of the diaphragm 96 is subject to brake pipe pressure and the chamber 95 at the left-hand side is subject to the pressure in the equalizing reservoir 79. Therefore, as the equalizing reservoir 79 is charged from the main reservoir 7 in the manner hereinafter described, fluid under pressure will flow from the equalizing reservoir 79 to the chamber 95 and operate the relay valve 24 to supply fluid under pressure to the brake pipe 8 and that portion of the train brake pipe connected to the lead locomotive in the usual manner. Accordingly, it will be understood from the foregoing that the automatic brake valve 9 on the lead locomotive operates to effect the supply of fluid under pressure to that portion of the train brake pipe connected to the lead locomotive to cause the charging thereof to the normal pressure carried therein.

In the closed position of the switch 2 its normally open contact 101 establishes a circuit between a wire 102 that is connected to the wire 84 which in turn is connected to the hereinbefore-mentioned power supply wire 40, and a wire 103 that is connected to an automatic brake release relay (not shown) in the function selector unit 17 to cause energization or pickup of this relay. Whenever this relay is thus picked up, transmission of the brake release command signal to the slave locomotive is made via radio-transmitted signals effected by operation of the coding system 18, transmitter 19 and antenna 20.

When this brake release command signal is received on the slave locomotive, it effects energization of a solenoid coil of a brake valve charging cutout spool valve which is thereupon moved to a position to release fluid under pressure from a pressure chamber of this brake pipe cutoff valve of the automatic brake valve 9 on the slave locomotive. Upon this release of fluid under pressure from this brake pipe cutoff valve on the slave locomotive, the automatic brake valve 9 on this locomotive is rendered effective to supply fluid under pressure to the train brake pipe. Consequently, the automatic brake valves 9 on the two locomotives operate substantially simultaneously to supply fluid under pressure to the train brake pipe to cause a complete release of the brakes on all the cars and locomotives in the train.

A wire 104 has one end connected to the wire 103 intermediate the ends thereof and the opposite end connected to one end of the solenoid-actuating coil 82 of the spool valve 80 the opposite end of this coil being connected to ground, as shown in the drawings. Consequently, the solenoid-actuating coil 82 is energized simultaneously as the automatic brake release relay in the function selector unit 17 is picked up. Upon energization of the solenoid-actuating coil 82, the spool valve 80 is moved against the yielding resistance of a second spring 105 to a position denoted in the drawings by the numeral 106 in which one end of the pipe 89 is connected through the spool valve 80 to one end of a pipe 107 that at its opposite end is connected to the pipe 32. Consequently, fluid under pressure will flow from the main reservoir 7 to the equalizing reservoir 79 to cause charging of this reservoir 79 and the chamber 95 in the relay valve 24. Accordingly, it will be understood from the foregoing that the relay valve 24 of the automatic brake valve 9 on the lead locomotive operates in response to the supply of fluid under pressure to the equalizing reservoir 79 and the chamber 95 in the relay valve 24 on this locomotive to effect the supply of fluid under pressure to that portion of the train brake pipe connected to this lead locomotive, and that the relay valve 24 of the automatic brake valve 9 on the slave locomotive operates in response to the brake release command signal transmitted thereto from the lead locomotive so that substantially simultaneously fluid under pressure is supplied to that portion of the train brake pipe connected to the respective locomotive to cause a brake release on all the locomotives and cars in the train.

For controlling the supply of fluid under pressure to and the release of fluid under pressure from the brake cylinder 6 on the lead locomotive and for controlling the transmission of brake application and brake release command signals to the slave locomotive when manually operating the independent brake valve 10 on the lead locomotive to control the brakes on only the locomotives in the train, the brake apparatus constituting the present invention further comprises, in addition to the fluid amplifiers 48 and 49 and the switches 3 and 4, a second double-solenoid-operated double-spring-returned spool valve 108. Since this second spool valve may be identical in construction and operation to the first spool valve 80, and since the two solenoid-actuating coils 109 and 110 of this second spool valve 108 are controlled by the switches 3 and 4 through circuitry identical to the circuitry through which the switches 1 and 2 control energization and deenergization of the solenoid-actuating coils of the first spool valve, the same numerals with the addition of the suffix a are used to denote the circuitry for these solenoid-actuating coils, it being noted that the wire 85A is connected to the hereinbefore-mentioned wire 41 and that the wire 103a is connected to an independent brake application relay (not shown) in the function selector unit 17. When this independent brake application relay is energized or picked up, it effects transmission of the independent brake application command signal to the slave locomotive via the coding system 18, transmitter 19 and antenna 20 to cause an application of the brakes only on this slave locomotive substantially simultaneously as the brakes are applied on the lead locomotive.

The hereinbefore-mentioned pipe 107 has a branch 107a connected to the spool valve 108 in order that, upon movement of this spool valve against the yielding resistance of a spring 111 to the position indicated by the numeral 112, fluid under pressure may flow from the main reservoir 7 to the brake cylinder 6 via pipes 32 and 107, branch 107a, the spool valve 108 and a pipe 113 that connects this spool valve to one inlet port of a double check valve 114, this double check valve 114, and a pipe 115 that connects the outlet port of this double check valve to the brake cylinder 6 to cause an independent brake application on the lead locomotive. The other inlet port of double check valve 114 is connected by a pipe 116 to the brake cylinder port in the hereinbefore-mentioned brake control valve 12.

A pipe 117 having a normally open manually operable shutoff valve 118 and a choke 119 disposed in series therein has one end connected to the pipe 113 intermediate the ends thereof and the opposite end connected to the pipe 77 adjacent the control input 72 of the fluid amplifier 49 in order that fluid under pressure supplied to the brake cylinder 6 when effecting an independent brake application may flow to the control inputs 72 of the fluid amplifiers 48 and 49 to pressurize the respective outputs 65 and depressurize the respective outputs 66 to cause these fluid amplifiers 48 and 49 to assume one of their two bistable states. It will be understood that the choke 119 provides a low-pressure fluidic supply of fluid pressure to the control inputs 72 of the fluid amplifiers 48 and 49 since the pressure in the brake cylinder 6 may reach a value of, for example, 50 pounds per square inch.

In order to provide for effecting automatic operation of the brake equipment on all the locomotives and cars in the train by manual operation of the automatic brake valve 9 on the lead locomotive should the first fluidic circuit, including the bistable fluid amplifiers 46 and 47, the switches 1 and 2, and the corresponding spool valve 80 together with the circuitry therefor, become inoperative, the brake equipment on the lead locomotive comprises a pipe 120 and a cutout cock or valve 121. As shown in the drawings, one end of the pipe 120 having the cutout cock 121 therein is connected to the pipe 56 above or on the automatic brake valve side of the shutoff valve 55 and the opposite end is connected to the pipe 94 intermediate the ends thereof.

Accordingly, should the first fluidic circuit become inoperative, the engineer will manually open valve 121 and close shutoff valves 55 and 92 whereupon all fluid under pressure is cut off from the bistable fluid amplifiers 46 and 47 and the equalizing reservoir 79 is connected directly to the delivery chamber 57 in the control valve 25 of the automatic brake valve 9 via pipes 89, 91, 94, 120 having now open valve 121 therein, and pipe and passageway 56. Thereafter, the pressure in the equalizing reservoir 79 and chamber 95 in the relay valve 24 can be varied by operation of the control valve 25 in response to manual movement of a handle 122 of the brake valve 9 between its release position and any chosen position in its application zone to cause relay valve 24 to effect corresponding variations of the pressure in the train brake pipe.

Likewise, in order to effect an independent application and an independent release of the brakes only on the lead locomotive by manual operation of the independent brake valve 10 on this locomotive should the second fluidic circuit, including the bistable fluid amplifiers 48 and 49, the switches 3 and 4 and the corresponding spool valve 108 together with the circuitry therefor, become inoperative, the brake equipment on the lead locomotive further comprises a pipe 123 and a cutout cock or valve 124. As shown in the drawings, one end of the pipe 123 having the cutout cock 124 therein is connected to the pipe 63 above or on the independent brake valve side of the shutoff valve 62 and the opposite end is connected to the pipe 117 on the right-hand side of the shutoff valve 118 therein.

Accordingly, upon the occurrence of a malfunction in the second fluidic circuit, the engineer will manually open valve 124 and close shutoff valves 62 and 118 whereupon all fluid under pressure is cut off from the bistable fluid amplifiers 48 and 49. The engineer may now effect an independent brake application on the lead locomotive by moving the handle 42 of the independent brake valve 10 out of its release position and to a position in its application zone corresponding to the degree of brake application desired. The self-lapping valve unit 29 operates in response to this movement of the handle 42 to supply fluid under pressure from the main reservoir 7 to the brake cylinder 6 via pipe and passageway 32, delivery chamber 64, passageway and pipe 63, pipe 123 having now open valve 124 therein, pipes 117 and 113, double check valve 114 and pipe 115.

OPERATION

Let it be supposed that a locomotive is provided with the brake control apparatus shown in the drawings and that this locomotive is the lead locomotive in an RMU train consist. Let it be further supposed that a locomotive is coupled between two cars in the train which may be at a distance from the lead locomotive, and that the brake control equipment on this slave locomotive includes, with the exception of the first and second fluidic circuits and spool valves 80 and 108, the same brake control equipment as is shown in the drawings with the addition of a brake control center which may be, such as, for example, an A–410 brake control center manufactured by the aforesaid Westinghouse Air Brake Division. It will be understood that this brake control equipment on the slave locomotive is operative in response to the radio-transmitted signals from the lead locomotive to control the pressure in the equalizing reservoir on the slave locomotive and correspondingly the pressure in that portion of the train brake pipe extending in both directions from this slave locomotive.

After a train is made up the lead and slave locomotive control equipments must be conditioned as follows:

1. The controls on the lead locomotive set for lead operation.
2. The selector valve 28 of the automatic brake valve 9 on both the lead and the slave locomotives set in freight position.
3. The power supply switch of the selector and indicator console 23 shown in the drawings is set in power ON position, it being understood that a fluid pressure brake switch on this console 23 is set in an IN position, subsequent to the setting of this power supply switch in its power ON position.
4. The controls on the slave locomotive or locomotive set for trailing operation, except for the fluid pressure brakes, which must be set for lead operation.
5. The handle 122 of the automatic brake valve 9 and the handle 42 of the independent brake valve 10 on the slave locomotive must be moved to their brake release position.
6. The function selector unit on the slave locomotive set in power ON position.

In order to initially effect charging of the brake pipe 8 on the lead locomotive and the train brake pipe that extends back through each car in the train and the brake equipment on each of these cars, the engineer on the lead locomotive will manually move the handle 122 of the automatic brake valve 9 on this locomotive to its brake release positions.

Also, it may be assumed that a regulating spring 125 of the self-lapping control valve 25 of the automatic brake valve 9 on both the lead and the slave locomotives has been manually adjusted by means of an adjusting screw 126 so that this control valve 25 will provide in its delivery chamber 57 a desired normal pressure, which, for example, may be 70 pounds per square inch.

It will be understood that while the selector valve 28 of the brake valve 9 on each locomotive occupies its freight position, the supply of fluid under pressure from the main reservoir 7 on the respective locomotive to the corresponding equalizing reservoir cutoff valve 27 will be effected only while the handle 122 occupies its brake release position to cause opening of this valve. Consequently, fluid under pressure will flow from the delivery chamber 57 of the control valve 25 of the brake valve 9 on the lead locomotive to the inlet of choke 53 via the passageway and corresponding pipe 56, now open shutoff valve 55 and pipe 54. Accordingly, it will be understood that the pressure in the pipes 56 and 54 is increased until it corresponds to the setting of the control valve 25 which setting may provide for a pressure of, for example, 70 pounds per square inch as aforestated.

As hereinbefore stated, this choke 53 provides a low-pressure fluidic supply of fluid pressure to the supply ports 50 of the bistable fluid amplifiers 46 and 47 via pipes 52 and 51. Some of the fluid under pressure supplied to the pipe 51 flows therefrom to the control inputs 71 of these fluid amplifiers 46 and 47 via the respective pipes 73 and chokes 74, 74a therein it being understood that the chokes 74, 74a insure that the pressure of the fluid supplied to these control inputs 71 is less than that of the fluid supplied to the corresponding supply ports 50 in a manner typical of pure fluid amplifiers as is well known in the art of fluid amplifiers. Accordingly, the fluid under pressure supplied to the control input 71 of the fluid amplifier 46 will cause the fluid under pressure supplied to supply port 50 thereof to flow to the outputs 66 of this amplifier which output is open to atmosphere. Likewise, the fluid under pressure supplied to the control input 71 of the fluid amplifier 47 will cause it to assume one of its bistable states in which the fluid under pressure supplied to the supply port 50 thereof will flow to the output 66 of this amplifier which output 66 is connected to the fluid pressure operated switch 2 by the pipe 68.

Fluid under pressure thus supplied to the fluid pressure operated switch 2 operates its normally open contact 101 to closed position in which it establishes a circuit between the wire 102 that is connected to the positive power supply wire 40 via wire 84 and the wire 103 that is connected to the automatic brake release relay (not shown) in the function selector unit 17 to cause energization or pickup of this relay. Whenever this relay is thus picked up, transmission of the automatic brake release command signal to the slave locomotive is made via radio-transmitted signals effected by the coding system 18, transmitter 19 and antenna 20. When this automatic brake release command signal is received on the slave locomotive it effects energization of a solenoid coil of a brake valve charging cutout spool valve which is thereupon moved to a position to release fluid under pressure from a pressure chamber of a brake pipe cutoff valve (not shown) of the brake valve 9 on the slave locomotive. Upon this release of fluid under pressure from the brake pipe cutoff valve on the slave locomotive, the relay valve 24 of the brake valve 9 on this locomotive is rendered effective to supply fluid under pressure to the train brake pipe.

Since the wire 104 connects the wire 103 to one end of the solenoid-actuating coil 82 of the spool valve 80, operation of contact 101 of switch 2 to its closed position establishes a circuit for effecting energization of this coil 82.

Upon energization of coil 82, the spool valve 80 is moved against the yielding resistance of the spring 105 to the position denoted by the numeral 106 in which the pipe 107 is connected to the pipe 89. Fluid under pressure will now flow from the main reservoir 7 to the equalizing reservoir 79 via pipes 32 and 107, the valve 80 and the pipe 89.

Some of the fluid under pressure thus supplied to the equalizing reservoir 79 flows therefrom to the chamber 95 in relay valve 24 via pipes 89, 91, 94 and the corresponding passageway 94. Fluid under pressure thus supplied to the chamber 95 operates this relay valve 24 to effect the supply of fluid under pressure from the main reservoir 7 to the brake pipe 8. Consequently, it will be understood that fluid under pressure is now supplied to the train brake pipe substantially simultaneously by operation of the relay valve 24 of the automatic brake valve 9 on both the lead and slave locomotives.

Since the brake control valve 12 on the lead locomotive is connected to the brake pipe 8 by the branch pipe 16, fluid under pressure will flow from the brake pipe 8 to the brake control valve 12 to effect operation thereof to its release position in which it causes fluid under pressure to be completely released from the brake cylinder 6 thereby releasing the brakes on the lead locomotive, and in which it causes the auxiliary reservoir 13, control reservoir 14 and selector volume reservoir 15 to be charged to the pressure carried in the brake pipe 8. Likewise, the brake control valves on all the cars in the train will operate in response to charging of the train brake pipe to the normal pressure carried therein, which may be, for example as hereinbefore stated, 70 pounds per square inch, to effect a complete release of the brakes on these cars.

Furthermore, some of the fluid under pressure supplied to the equalizing reservoir 79 in the manner described above flows via pipes 89 and 91, shutoff valve 92 which it will be understood is now open, and choke 93 to the control input 72 of the fluid amplifier 47 so that the pressure at the control input 72 increases simultaneously as the pressure in the equalizing reservoir 79 increases.

Assuming that the handle 122 of the automatic brake valve 9 on the lead locomotive occupies its brake release position, that the shutoff valves 55 and 92 are open, and that the adjusting screw 126 of the control valve 25 of brake valve 9 has been manually adjusted so that this control valve 25 will provide in its delivery chamber 57 the desired normal pressure, which, as aforesaid, may be 70 pounds per square inch, it will be understood that this pressure is present in the pipe 54 at the inlet to the choke 53 and a correspondingly lower pressure is present in the pipes 52 and 51, at the supply ports 50 of the fluid amplifiers 46 and 47, and in the pipe 68 which is connected to the switch 2.

Consequently, when the pressure at the control input 72 of the fluid amplifier 47 exceeds the pressure at the input 71 of this fluid amplifier by a predetermined amount as governed by the inherent characteristics of this amplifier 47, this bistable fluid amplifier switches from its aforementioned one stable state to its other stable state in which the fluid under pressure supplied to the supply port 50 of this amplifier will flow to atmosphere via the corresponding output 65. Fluid under pressure will now flow from the switch device 2 to atmosphere via pipe 68, output 66 and a vent (not shown) which is provided in this type of bistable fluid amplifier. When fluid under pressure is thus released from the switch 2 to atmosphere, the contact 101 of this switch moves to its open position thereby opening the power supply circuit to the solenoid coil 82 of the spool valve 80 and the automatic brake release relay in the function selector unit 17.

When the power supply circuit to the solenoid coil 82 is thus opened, the spool valve 80 is returned to its center position shown by the springs 87 and 105 thereby terminating the supply of fluid under pressure from the main reservoir 7 to the equalizing reservoir 79 and the chamber 95 of the relay valve 24 of brake valve 9 on the lead locomotive whereupon this relay valve is operated to its lap position thereby terminating the supply of fluid under pressure from the main reservoir 7 on the lead locomotive to that portion of the train brake pipe coupled to this locomotive.

Likewise, when the power supply circuit to the automatic brake release relay in the function selector unit 17 is opened, the coding system 18, transmitter 19 and antenna 20 cease to transmit brake release command signals to the slave locomotive whereupon the automatic brake valve 9 on this slave locomotive operates to terminate the supply of fluid under pressure to the corresponding equalizing reservoir and that portion of the train brake pipe coupled thereto.

Accordingly, it will be understood that the automatic brake valve 9 on each locomotive in the train operates substantially simultaneously to effect the supply of fluid under pressure to that portion of the train brake pipe coupled to the respective locomotive until contact 101 of switch 2 opens to cause substantially simultaneous release of the brakes on all the cars and locomotives in the train.

Subsequent to switching of the bistable fluid amplifier 47 from its one stable state to its other stable state, as described above, and movement of the spool valve 80 to its center position shown to cut off flow of fluid under pressure from the main reservoir 7 to the equalizing reservoir 79, fluid under pressure will flow from the equalizing 79 to atmosphere via pipes 89 and 91, open shutoff valve 92, choke 93, control input 72 and output 65 of amplifier 47 and also via pipe 75, choke 76, control input 72 and output 66 of amplifier 46.

When this flow of fluid under pressure from the equalizing reservoir 79 to atmosphere reduces the pressure at the control input 72 of amplifier 47 below the pressure at the control input 71 of this amplifier, it being understood that the pressure at this control input 71 is maintained constant by the self-lapping control valve 25, the amplifier 47 will switch from its above-mentioned other stable state back to its one stable state to again effect the supply of fluid under pressure from the supply port 50 of amplifier 47 to the switch 2 via output 66 of this amplifier 47 and pipe 68.

This supply of fluid under pressure to the switch 2 operates its contact 101 to closed position whereupon spool valve 80 is operated in the manner hereinbefore described to effect the supply of fluid under pressure from the main reservoir 7 to the equalizing reservoir 79 and the control input 72 of the amplifier 47 until the pressure at this control input 72 again exceeds the pressure at the input 71 of this amplifier 47 whereupon it again switches from its one stable state to its other stable state. Accordingly, from the foregoing, it is apparent that the pressure in the equalizing reservoir 79 and also in the chamber 95 of relay valve 24 of the brake valve 9 on the lead locomotive, is maintained substantially constant so long as the handle 122 of this brake valve remains in its release position. Likewise, the pressure in the train brake pipe will be maintained substantially constant and the brakes released so long as the handle 122 of the brake valve 9 on the lead locomotive remains in its release position.

The engineer on the lead locomotive may now start the train on its journey to the next terminal or station.

Let it be supposed that after the train has traveled some distance from its starting point, it must descent a grade which requires that the engineer on the lead locomotive effect a brake application on the entire train. Accordingly, the engineer will move the handle 122 of the automatic brake valve 9 on the lead locomotive out of its release position and to a position in its application zone corresponding to the degree of reduction of pressure desired in the train brake pipe. Therefore, the self-lapping control valve 25 of the automatic brake valve 9 will now be operated in the usual manner in which an exhaust valve 127 (FIG. 1) that is disposed in the chamber 57, is unseated from its valve seat 128. When valve 127 is thus unseated, the pressure at the control inputs 71 of the bistable fluid amplifiers 46 and 47 will be reduced by flow of fluid under pressure from these inputs to atmosphere via corresponding pipes 73 having chokes 74, 74a therein, pipes 51 and 52, choke 53, pipe 53, open shutoff valve 55, pipe and passageway 56, delivery chamber 57 (FIG. 1), past now unseated valve 127, a port 129 in an exhaust valve seat member 130, a chamber 131 in a control valve cover 132, and a port 133 in this cover. Likewise, the pressure at the output 65 of the fluid amplifier 47 and at the output 66 of the fluid amplifier 46 will be reduced by flow of fluid under pressure from these outputs to atmosphere via the respective amplifier, their supply ports 50, pipe 51 and the pathway described above. Accordingly, the pressure at the above-mentioned control inputs 71 and outputs 65 and 66 is reduced until the self-lapping control valve 25 of the brake valve 9 moves to its lap position to seat exhaust valve 127 on its seat 128.

When the pressure at the control input 71 of the fluid amplifier 46 is thus reduced below the pressure at control input 72 of this amplifier 46, which input 72 is supplied with fluid under pressure from the equalizing reservoir 79 via pipes 89 and 91, now open shutoff valve 92, choke 93, pipe 75 and choke 76, the higher pressure at the control input 72 of amplifier 46 causes this amplifier to switch from its one stable state to its other stable state in which fluid under pressure supplied to the supply port 50 of this amplifier 46 will flow to the fluid pressure operated switch 1 via the corresponding output 65 and pipe 67.

Fluid under pressure thus supplied to the switch 1 operates its normally open contact 83 to closed position in which it establishes a circuit between the wire 84 that is connected to the positive power supply wire 40 and the wire 85 that is connected to the automatic brake application relay in the function selector unit 17 to cause energization or pickup of this relay. Whenever this relay is thus picked up, transmission of the automatic brake application command signal to the slave locomotive is made via radio-transmitted signals effected in the manner hereinbefore described. As aforestated, the brake control equipment on the slave locomotive is operative in response to receiving these signals to effect a reduction of pressure in the equalizing reservoir on this locomotive and a corresponding reduction of pressure in those portions of the train brake pipe connected thereto so long as these radio-transmitted signals are received from the lead locomotive.

Closing of the contact 83 of switch 1 in the manner described above also effects energization of solenoid-actuating coil 81 of spool valve 80 since this solenoid is connected to the wire 85 by the wire 86.

Upon energization of the solenoid actuating coil 81, the spool valve 80 is shifted against the yielding resistance of the spring 87 to the position denoted by the numeral 88 in which the pipe 89 is connected to service exhaust choke 90. Fluid under pressure will now flow at a service rate from the equalizing reservoir 79 to atmosphere via pipe 89, the valve 80 and service exhaust choke 90. Fluid under pressure will also flow from the chamber 95 in the relay valve 24 of the brake valve 9 on the lead locomotive to atmosphere via passageway and pipe 94, pipes 91 and 89, the valve 80 and choke 90 at a service rate.

Fluid under pressure will also flow from the control inputs 72 of the amplifiers 46 and 47 to atmosphere via pipe 75, choke 76, pipe 91, choke 93, now open shutoff valve 92, pipe 89, valve 80 and choke 90 at this service rate.

As fluid under pressure is thus released from the chamber 95, this relay valve 24 operates in response thereto to effect a corresponding reduction of pressure in the brake pipe 8 and in that portion of the train brake pipe connected thereto. Accordingly, the substantially simultaneous reduction of pressure effected in the several portions of the train brake pipe by the automatic brake valve 9 on the two locomotives in the train causes a service brake application to be effected on these locomotives and all the cars in the train.

When the control valve 25 of the brake valve 9 on the lead locomotive reduces the pressure in the passageway and pipe 56 and the pipe 54 to a pressure corresponding to the position in its application zone to which the handle 122 of this brake valve was manually moved, this control valve will move to its lap position thereby seating exhaust valve 127 on its seat 128, and preventing further flow of fluid under pressure from the supply port 50 and control input 71 of fluid amplifiers 46 and 47 to atmosphere. The continued flow of fluid under pressure from the control inputs 72 of the amplifiers 46 and 47 to atmosphere via the pathway described above will quickly reduce the pressure at these control inputs 72 to a value less than the pressure at the corresponding control inputs 71.

Accordingly, upon the pressure at the control inputs 72 becoming less than that at the control inputs 71, the amplifiers 46 and 47 will both switch from their above-mentioned other stable state back to their one stable state to again effect the supply of fluid under pressure from the supply port 50 of amplifier 47 to the switch 2 via output 66 of this amplifier 47 and pipe 68.

This supply of fluid under pressure to switch 2 operates its contact 101 to close position whereupon the spool valve 80 effects in the manner hereinbefore described the supply of fluid under pressure from the main reservoir 7 to (1) the equalizing reservoir 79, (2) the chamber 95 in the relay valve 24 of the brake valve 9 on the two locomotives in the train, and (3) the control inputs 72 of the fluid amplifiers 46 and 47 so that the pressure at these control inputs 72 quickly exceeds the pressure at the corresponding control inputs 71. Consequently, the fluid amplifiers 46 and 47 again switch from their one stable state to their other stable state. This switching, upon the pressure in the chamber 95 of the relay valves 24 increasing approximately one-half of a pound per square inch is not sufficient to operate these relay valves 24 to cause an undesired brake release. Accordingly, the brakes on the two locomotives and all the cars in the train will remain applied so long as the handle 122 of the brake valve 9 on the lead locomotive remains in the position in its application zone to which it was moved by the engineer.

The brakes on the entire train can be subsequently released by the engineer manually moving the handle 122 of the brake valve 9 on the lead locomotive out of the position it occupies in its application zone and back to its brake release position. Upon return of the handle 122 to its brake release position, the corresponding control valve 25 operates to effect the supply of fluid under pressure to the pipes 56 and 54 whereupon the pressure therein is increased until it corresponds to the setting of the control valve 25. As hereinbefore stated, the choke 53 provides a corresponding low-pressure fluidic supply of fluid pressure to the supply ports 50 and control inputs 71 of the fluid amplifiers 46 and 47 which now operate to effect a release of the brakes on the two locomotives and all the cars in the train in the manner hereinbefore described.

Let it now be supposed that while the brakes on the entire train are released and the train is traveling along the track toward its destination it becomes necessary that the engineer on the lead locomotive effect an emergency brake application.

To effect an emergency brake application on the entire train, the engineer on the lead locomotive will move the handle 122 of the brake valve 9 on this locomotive from its release position to its emergency position to effect a reduction of pressure in the brake pipe 8 and in that portion of the train brake pipe extending from the lead locomotive toward the slave locomotive at a rapid or emergency rate. The control valve 12 on the lead locomotive operates in response to this reduction of pressure in the brake pipe 8 at an emergency rate to effect a corresponding emergency brake application on this locomotive.

When the handle 122 is manually moved by the engineer to its emergency position, the emergency valve is moved to a position to establish a communication via which fluid under pressure is supplied from the main reservoir 7 to a passageway and corresponding pipe 134 which is connected to the switch 5, whereupon a contact 135 of this switch is moved to its closed position in which it establishes a circuit between a wire 136 connected to the power supply wire 40 and a wire 137 connected to an emergency relay (not shown) in the function selector unit 17 on the lead locomotive to cause pickup of this relay.

When this emergency relay is thus picked up, transmission of the emergency application command signal to the slave locomotive is made via radio-transmitted signals effected by the coding system 18, transmitter 19 and antenna 20 on the lead locomotive. It will be understood that the brake control equipment on the slave locomotive is operative in response to the emergency application command transmitted thereto from the lead locomotive via radio signals to effect a reduction of pressure in the brake pipe on the slave locomotive and in the portions of the train brake pipe extending from each end of this slave locomotive at an emergency rate. Accordingly, it will be understood that the brake control valves on the two locomotives and all the cars in the train operate substantially simultaneously in response to a reduction of pressure in the train brake pipe at an emergency rate to effect an emergency brake application on the entire train.

When the train has been brought to a stop and all danger has past, the emergency brake application can be released by the engineer moving the handle 122 of the brake valve 9 on the lead locomotive from its emergency position back to its release position.

Let it now be supposed that, while the brakes of the entire train are released, the engineer desires to manually effect an independent brake application on the two locomotives by use of the independent brake valve 10 on the lead locomotive. To do so, he will move the handle 42 of this independent brake valve 10 from its release position into a service zone an extent corresponding to the degree of brake application desired. When the handle 42 is moved into the service zone, a cam 138 (FIG. 1) is correspondingly rotated to first effect seating of an exhaust valve 139 on its corresponding valve seat 140 and then to effect unseating of a supply valve 141 from its corresponding valve seat 142 in the usual well-known manner of operation of self-lapping valve units. Upon the unseating of supply valve 141, fluid at main reservoir pressure will flow from the main reservoir 7 to the passageway and corresponding pipe 63 via pipe and passageway 32, past open supply valve 141, delivery chamber 64 and passageway 63. Accordingly, it will be understood that the pressure in the pipes 63 and 61 (FIG. 1A), assuming that the shutoff valve 62 is open, is increased until it corresponds to the position of the handle 42 in its service zone.

As hereinbefore stated, the choke 60 provides a low-pressure fluidic supply of fluid pressure to the supply ports 50 of the bistable fluid amplifiers 48 and 49 via pipes 59 and 58. Some of the fluid under pressure supplied to the pipe 58 flows therefrom to the control input 71 of these fluid amplifiers 48 and 49 via the respective pipes 73 and chokes 74a, 74 therein, it being understood that the chokes 74a, 74 insure that the pressure of the fluid supplied to these control inputs 71 is less than that of the fluid supply to the corresponding supply ports 50 in a manner typical of pure fluid amplifiers as is well known in the art of fluid amplifiers. Accordingly, the fluid under pressure supplied to the control input 71 of the fluid amplifier 48 will cause the fluid under pressure supplied to supply port 50 thereof to flow to the output 66 of this amplifier which output is open to atmosphere. Likewise, the fluid under pressure supplied to the control input 71 of the fluid amplifier 49 will cause it to assume one of its bistable states in which the fluid under pressure supplied to the supply port 50 thereof will flow to the output 66 of this amplifier 49 which output 66 is connected to the fluid pressure operated switch 4 by the pipe 70. Fluid under pressure thus supplied to the switch 4 operates its normally open contact 101a to closed position in which it establishes a circuit between the wire 102a that is connected to the power supply wire 40 via wire 84a and the wire 103a that is connected to the independent brake application relay (not shown) in the function selector unit 17 to cause energization or pickup of this relay. Whenever this relay is thus picked up, transmission of the independent brake application command signals to the slave locomotive is made via radio-transmitted signals effected by the coding system 18, transmitter 19 and antenna 20. When this independent brake application command is received on the slave locomotive, it will be understood that the brake control equipment on the slave locomotive is operative in response to receiving these signals to effect the supply of fluid under pressure to the brake cylinder on the slave locomotive to effect an independent brake application on this locomotive.

Since the wire 104a connects the wire 103a to one end of the solenoid-actuating coil 110 of the spool valve 108, operation of contact 101a of switch 4 to its closed position establishes a circuit for effecting energization of this coil 110.

Upon energization of coil 110, the spool valve 108 is moved against the yielding resistance of the corresponding spring 111 to the position denoted by the numeral 112 in which the pipe 107a is connected to the pipe 113. Fluid under pressure will now flow from the main reservoir 7 to the brake cylinder 6 via pipes 32, 107 and 107a, spool valve 108, pipe 113, double check valve 114 and pipe 115 to effect an independent brake application on the lead locomotive substantially simultaneously as an independent brake application is effected on the slave locomotive.

Furthermore, it will be noted from FIG. 1 of the drawings that some of the fluid under pressure supplied to the passageway 63 will flow therefrom to a chamber 143 at the left-hand side of a diaphragm 144 via a choke 145 to cause the self-lapping valve unit 29 to operate to its lap position when the pressure in pipe 63 and the corresponding pressure in the brake cylinder 6 (FIG. 1A) on the lead locomotive and also on the slave locomotive, reaches a pressure corresponding to the position in its service zone to which the handle 42 of independent brake valve 10 was moved by the engineer.

Some of the fluid under pressure supplied to the pipe 58 in the manner described above flows to the control input 71 of amplifiers 48 and 49 via the corresponding pipes 73 and respective chokes 74a and 74 therein. Also, some of the fluid under pressure supplied to the pipe 113 by the spool valve 108 flows from this pipe 113 to the control input 72 of the amplifier 49 via pipe 117, now open valve 118 and choke 119 so that the pressure at this control input 72 increases simultaneously as the pressure in the brake cylinder 6 increases.

Consequently, when the pressure at the control input 72 of the fluid amplifier 49 exceeds the pressure at the control input 71 of this amplifier 49 by a predetermined amount as governed by the inherent characteristics of this amplifier, it switches from its one stable state to its other stable state in which the fluid under pressure supplied to the supply port 50 of this amplifier will flow to atmosphere via the corresponding output 65. Fluid under pressure will now flow from the switch device 4 to atmosphere via pipe 70, output 66 and a vent (not shown) which is provided in this type of bistable fluid amplifier. When fluid under pressure is thus released from the switch 4, its contact 101a moves to its open position thereby opening the power supply circuit to the solenoid coil 110 of spool valve 108 and the independent brake application relay in the function selector unit 17.

When the power supply circuit to the solenoid coil 110 is thus opened, the valve 108 is returned to its center position shown by the spring 111 and a spring 146 thereby terminating the supply of fluid under pressure to the brake cylinder 6 on the lead locomotive.

Likewise, the independent brake application relay in the function selector unit 17 is deenergized to cause termination of the supply of fluid under pressure to the brake cylinder on the slave locomotive substantially simultaneously as the supply of fluid under pressure to the brake cylinder 6 on the lead locomotive is terminated.

Subsequent to switching of the amplifier 49 from its one stable state to its other stable state, as described above, and movement of the spool valve 108 to the position shown, fluid under pressure will flow from the brake cylinder 6 to atmosphere via pipe 115, double check valve 114, pipes 113 and 117, now open valve 118, choke 119, control input 72 and output 65 of amplifier 49.

When this flow of fluid under pressure to atmosphere reduces the pressure at the control input 72 of amplifier 49 below the pressure at the control input 71 of this amplifier, it being understood that the pressure at this control input 71 is maintained constant by the self-lapping unit 29 of independent brake valve 10, this amplifier 49 will switch from its above-mentioned other stable state back to its one stable state to again effect the supply of fluid under pressure to the switch 4 via output 66 of this amplifier 49 and pipe 70.

This supply of fluid under pressure to the switch 4 operates its contact 101a to its closed position whereupon fluid under pressure is again supplied from the main reservoir on the two locomotives in the train to the corresponding brake cylinder in the manner hereinbefore described until the pressure therein is increased to its former value. Accordingly, it will be understood that the pressure in the brake cylinder on the several two locomotives in the train is maintained substantially constant at a value corresponding to the position the handle 42 occupies in its application zone so long as the handle 42 remains in this position.

To release the above-described independent brake application on the two locomotives in the train, the engineer will return the handle 42 of the independent brake valve 10 on the lead locomotive to its release position. As the handle 42 is thus returned to its release position, the self-lapping valve unit 29 of the brake valve 10 will operate in the usual manner to completely release fluid under pressure from the passageway and pipe 63, pipes 61, 59, 58 and 73, and control inputs 71 and supply ports 50 of fluid amplifiers 48 and 49 to atmosphere. This flow of fluid under pressure from the control input 71 of the amplifier 49 to atmosphere will quickly reduce the pressure at this input below the pressure at the corresponding control input 72.

When the pressure at the control input 71 of fluid amplifier 49 is thus reduced below the pressure at control input 72 of this amplifier, which input 72 at this time is supplied with fluid under pressure from the brake cylinder 6 on the lead locomotive, the higher pressure at the control input 72 causes this amplifier to switch from its one stable state to its other stable state. Fluid under pressure will now flow from the switch 4 to atmosphere via pipe 70, output 66 and a vent (not shown) provided in this amplifier 49. When fluid under pressure is thus released from switch 4, its contact 101a moves to its open position thereby opening the power supply circuit to the solenoid coil 110 and the independent brake application relay in the function selector unit 17 whereupon the spool valve 108 is returned to its center position shown by the springs 109 and 146, and the transmission of the brake application command signals to the slave locomotive is terminated.

As hereinbefore stated, the choke 78 in the pipe 77 insures that the amplifier 48 switches from one stable state to another at a pressure less than that at which the amplifier 49 switches since this choke 78 provides that the pressure at the control input 72 of the amplifier 48 is less than that at the control input 72 of the amplifier 49. Accordingly, when the pressure at the control input 71 of the amplifier 48 is reduced, as the result of returning the handle 42 of the independent brake valve 10 to its release position, to a value less than the pressure at the control input 72 of this amplifier, which input 72 is supplied with fluid under pressure from the brake cylinder 6, the higher pressure at the control input 72 causes this amplifier 48 to switch from its one stable state to its other stable state.

When the amplifier 48 thus switches, fluid under pressure will flow from its supply port 50 to its output 65 and thence to the switch 3 via pipe 69 to effect closing of contact 83a of this switch to establish a circuit between the wire 84a and the wire 85a that is connected to the independent quick release relay in the function selector unit 17 via the wire 41 and to the solenoid coil 109 of the spool valve 108 via wire 86a.

When the power supply circuit to the independent quick-release relay in the function selector unit 17 is closed, this relay is picked up to cause an independent quick release of the brakes on the slave locomotive.

Likewise, when the power supply circuit to the solenoid coil 109 of spool valve 108 is closed, this valve is shifted against the yielding resistance of spring 146 to the position denoted by the numeral 147 in which pipe 113 is connected to a brake cylinder exhaust choke 148. Fluid under pressure will now flow from the brake cylinder 6 to atmosphere via pipe 115, double check valve 114, pipe 113, valve 108 and exhaust choke 148 to cause an independent release of the brakes on the lead locomotive. Accordingly, from the foregoing it is apparent that an independent release of the brakes on the two locomotives only in the train is effected substantially simultaneously.

Let it be supposed that a partial or full service brake application has been effected on the two locomotives and all the cars in the train by manual operation of the automatic brake valve device 9 on the lead locomotive, in the manner hereinbefore described.

Also, let it be supposed that subsequent to effecting a partial or full service brake application on the two locomotives and all the cars in the train, the engineer desires to effect a release of the brakes only on the two locomotives, without effecting a release of the brakes on the cars in the train.

To effect a release of the brakes on the two locomotives without effecting a release of the brakes on the cars in the train, the engineer will depress the handle 42 (FIG. 1) of the independent brake valve device 10 so that it is rocked clockwise about the pin 43 (FIG. 1). As the handle 42 is depressed, the roller 44 carried thereby is effective, through the intermediary of the pusher stem 45, to move the release valve 30 downward from the position shown in FIG. 1 to a position in which the peripheral annular groove 36 on the release valve 30 closes communication between the actuating pipe and passageway 34 and the atmospheric vent port 35, and establishes a communication between the actuating pipe and passageway 34 and the passageway and pipe 32 which is connected to the main reservoir 7. Therefore, when the release valve 30 is thus moved to its lower position by the engineer manually depressing the handle 42 of the independent brake valve 10, fluid under pressure will flow from the main reservoir 7 to the release selector valve portion of the quick release valve of the brake control valve 12 on the lead locomotive via pipe and passageway 32, groove 36 on independent release valve 30, and passageway and pipe 34 to effect a release of the brakes only on the lead locomotive.

As can be seen from FIG. 1A, some of the fluid under pressure supplied to the pipe 34 in the manner described above flows therefrom to the fluid pressure operated switch 38 via the pipe 37 to move the contact 39 of this switch to its closed position to establish the circuit between the power supply wire 40 and the wire 41. When this circuit is thus established, the independent quick-release relay in the function selector unit 17 is energized or picked up to effect transmission of the independent brake release command signal to the slave locomotive in the manner hereinbefore described to cause a release of the brakes only on this slave locomotive substantially simultaneously as the brakes are released on the lead locomotive.

Having now described the invention, what I claim as new and desire to secure by Letters Patent, is:

1. In a locomotive brake control system for a train of cars hauled by a locomotive, brake control apparatus for the locomotive comprising the combination of:
 a. a normally charged brake pipe variations of the fluid pressure in which are effective to control brake applications and brake releases on the locomotive and cars in the train,
 b. a normally charged equalizing reservoir,
 c. a brake valve having:
  i. a relay valve which is subject to the opposing pressure in said equalizing reservoir and said brake pipe and is operative by the differential of such pressures to control the pressure in said brake pipe, and
  ii. regulating valve means operative to provide a variable pressure, wherein the improvement comprises:
 d. a pure fluid circuit means comprising a pair of bistable fluid amplifiers each having a pressure supply port, a pair of control pressure inputs and a pair of pressure outputs, the fluid pressure at said supply port, one of said control inputs and one of said outputs being varied in accordance with the pressure provided in response to operation of said regulating valve means, and the fluid pressure at the other of said control inputs being varied in accordance with variation of the pressure in said equalizing reservoir whereby, upon the pressure at said one control input exceeding the pressure at said other control input, fluid under pressure flows from said supply port to one of said outputs and, upon the pressure at said other control input exceeding the pressure at said one control input, fluid under pressure flows from said supply port to the other of said outputs,
 e. electroresponsive valve means operative to effect the supply of fluid under pressure to and the release of fluid under pressure from said equalizing reservoir, and
 f. a pair of fluid pressure responsive switch devices, one of which is responsive to fluid under pressure supplied thereto from said one output of one of said bistable fluid amplifiers to establish a first circuit to said electroresponsive valve means to cause the operation thereof to effect the supply of fluid under pressure to said equalizing reservoir and the other of which is responsive to fluid under pressure supplied thereto from the other of said outputs of the other of said bistable fluid amplifiers to establish a second circuit to said electroresponsive valve means to cause the operation thereof to effect the release of fluid under pressure from said equalizing reservoir to atmosphere.

2. In a multiple-locomotive brake control system for a train of cars having a lead locomotive and at least one slave locomotive remotely located therefrom, brake control apparatus for the lead locomotive comprising the combination of:
 a. a normally charged brake pipe variations of the fluid pressure in which are effective to control brake applications and brake releases on the locomotives and cars in the train,
 b. a normally charged equalizing reservoir,
 c. a brake valve having:
  i. a relay valve which is subject to the opposing pressure in said equalizing reservoir and said brake pipe and is operative by the differential of such pressures to control the pressure in said brake pipe, and
  ii. regulating valve means operative to provide a variable pressure,
 d. coding and radio signal transmitting means for transmitting brake application and brake release command signals from the lead locomotive to a slave locomotive, wherein the improvement comprises:
 e. a pure fluid circuit means comprising a pair of bistable fluid amplifiers each having a pressure supply port, a pair of control pressure inputs and a pair of pressure outputs, the fluid pressure at said supply port, one of said control inputs and one of said outputs being varied in accordance with the pressure provided in response to operation of said regulating valve means, and the fluid pressure at the other of said control inputs being varied in accordance with variation of the pressure in said equalizing reservoir whereby, upon the pressure at said one control input exceeding the pressure at said other control input, fluid under pressure flows from said supply port to one of said outputs and, upon the pressure at said other control input exceeding the pressure at said one control input, fluid under pressure flows from said supply port to the other of said outputs,
 f. electroresponsive valve means operative to effect the supply of fluid under pressure to and the release of fluid under pressure from said equalizing reservoir, and
 g. a pair of fluid pressure responsive switch devices, one of which is responsive to fluid under pressure supplied thereto from said one output of one of said bistable fluid amplifiers to establish a first circuit to said electroresponsive valve means to cause the operation thereof to effect the supply of fluid under pressure to said equalizing reservoir and the other of which is responsive to fluid under pressure supplied thereto from the other of said outputs of the other of said bistable fluid amplifiers to establish a second circuit to said electroresponsive valve means to cause the operation thereof to effect the release of fluid under pressure from said equalizing reservoir to atmosphere,
 h. said fluid pressure responsive switch devices also being operatively effective in response to supply of fluid under pressure thereto to establish circuits to said coding and radio transmitting means to effect operation thereof to transmit brake control command signals to a slave locomotive.

3. In a multiple-locomotive brake control system for a train of cars, the combination as claimed in claim 2, further characterized in that said one fluid pressure switch device is effective to establish a first circuit to said coding and radio transmitting means to effect operation thereof to transmit a brake release command signal to a slave locomotive, and in that said other fluid pressure responsive switch device is effective to establish a second circuit to said coding and radio transmitting means to effect operation thereof to transmit a brake application command signal to a slave locomotive.

4. In a multiple-locomotive brake control system for a train of cars, the combination as claimed in claim 2, further characterized by valve means operative to cut operation of said pure fluid circuit means and render said regulating valve means operative to control the supply of fluid under pressure to said equalizing reservoir and the release of fluid under pressure from said reservoir to atmosphere.

5. In a locomotive fluid pressure brake control system for controlling braking of a train of cars hauled by the locomotive, brake control apparatus for the locomotive comprising the combination of:
 a. a normally charged brake pipe variations of the fluid pressure in which are effective to control brake applications and brake releases on the locomotives and cars in the train, b. a normally charged equalizing reservoir,
c. an automatic brake valve having;
   i. a relay valve which is subject to the opposing pressure in said equalizing reservoir and said brake pipe and is operative by the differential of such pressures to control the pressure in said brake pipe, and
   ii. regulating valve means operative to provide a variable pressure.
d. a brake applying means for effecting a brake application on the locomotive,
e. control valve means for supplying fluid under pressure to and releasing fluid under pressure from the brake-applying means responsively to variations of pressure in said brake pipe,
f. an independent brake valve having:
   i. a self-lapping valve means operative to provide a variable pressure, and
   ii. manually operable means for effecting operation of said self-lapping valve means, wherein the improvement comprises:
g. a first pair of bistable fluid amplifiers each having a supply port, a pair of control inputs and a pair of outputs, the fluid pressure at said supply port, one of said control inputs and one of said outputs being varied in accordance with the pressure provided by operation of said regulating valve means, and the fluid pressure at the other of said control inputs being varied in accordance with variation of the pressure in said equalizing reservoir whereby, upon the pressure at said one control input exceeding the pressure at said other control input, fluid under pressure flows from said supply port to one of said outputs and, upon the pressure at said other control input exceeding the pressure at said one control input, fluid under pressure flows from said supply port to the other of said outputs,
h. a first electroresponsive valve means, operative to effect the supply of fluid under pressure to and the release of fluid under pressure from said equalizing reservoir,
i. a first pair of fluid pressure responsive switch devices, one of which is responsive to fluid under pressure supplied thereto from said one output of one of said first pair of bistable fluid amplifiers to establish a first circuit to said first electroresponsive valve means to cause the operation thereof to effect the supply of fluid under pressure to said equalizing reservoir, and the other of which is responsive to fluid under pressure supplied thereto from the other of said outputs of the other of said first pair of bistable fluid amplifiers to establish a second circuit to said first electroresponsive valve means to cause the operation thereof to effect the release of fluid under pressure from said equalizing reservoir to atmosphere,
j. a second pair of bistable fluid amplifiers each having a supply port, a pair of control inputs and a pair of outputs, the fluid pressure at said supply port, one of said control inputs and one of said outputs being varied in accordance with the pressure provided by operation of said self-lapping valve means, and the fluid pressure at the other of said control inputs being varied in accordance with variation of the pressure in said brake-applying means whereby, upon the pressure at said one control input exceeding the pressure at said other control input, fluid under pressure flows from said supply port to one of said outputs and upon the pressure at said other control input exceeding the pressure at said one control input, fluid under pressure flows from said supply port to the other of said outputs,
k. a second electroresponsive valve means, operative to effect the supply of fluid under pressure to and the release of fluid under pressure from said brake-applying means, and
l. a second pair of fluid pressure switch devices, one of which is responsive to fluid under pressure supplied thereto from said one output of one of said second pair of bistable fluid amplifiers to establish a first circuit to said second electroresponsive valve means to cause the operation thereof to effect the supply of fluid under pressure to said brake-applying means to cause a brake application on the locomotive, and the other of which is responsive to fluid under pressure supplied thereto from the other of said outputs of the other of said second pair of bistable fluid amplifiers to establish a second circuit to said second electroresponsive valve means to cause the operation thereof to effect the release of fluid under pressure from said brake-applying means to atmosphere to cause a release of a brake application effected on the locomotive.

6. In a locomotive fluid pressure brake control system for controlling braking of a train of cars hauled by a lead locomotive and at least one slave locomotive remotely located therefrom, the combination claimed in claim 5, further characterized by coding and radio signal-transmitting means controlled by one of said pairs of fluid pressure responsive switch devices for transmitting corresponding command signals from the lead locomotive to a slave locomotive.

7. In a multiple-locomotive brake control system for a train of cars, the combination as claimed in claim 6, further characterized in that:
   a. said one fluid pressure responsive switch device of said first pair, while closed, is also effective to establish a first circuit to said coding and radio transmitting means to effect operation thereof to transmit an automatic brake release command signal to a slave locomotive, and
   b. said other fluid pressure responsive switch device of said first pair, while closed, is also effective to establish a second circuit to said coding and radio transmitting means to effect operation thereof to transmit an automatic brake application command signal to a slave locomotive.

8. In a multiple-locomotive brake control system for a train of cars, the combination as claimed in claim 6, further characterized in that one of said second pair of fluid pressure responsive switch devices is also effective, while closed, to establish a third circuit to said coding and radio transmitting means to effect operation thereof to transmit an independent brake application command signal to a slave locomotive, and in that the other one of said second pair of fluid pressure responsive switch devices is also effective, while closed, to establish a fourth circuit to said coding and radio transmitting means to effect operation thereof to transmit an independent brake release command signal to a slave locomotive.

9. In a locomotive brake control system for a train of cars hauled by a locomotive, brake control apparatus for the locomotive comprising the combination of:
   a. an independent brake valve having:
      i. a self-lapping valve means operative to provide a variable pressure, and
      ii. manually operable means for effecting operation of said self-lapping valve means,
   b. brake-applying means for effecting a brake application on the locomotive, wherein the improvement comprises:
   c. a pair of bistable fluid amplifiers each having a supply port, a pair of control inputs and a pair of outputs, the fluid pressure at said supply port, one of said control inputs and one of said outputs being varied in accordance with the operation of said self-lapping valve means, and the fluid pressure at the other of said control inputs being varied in accordance with variations of the pressure in said brake-applying means whereby, upon the pressure at said one control input exceeding the pressure at said other control input, fluid under pressure flows from said supply port to one of said outputs and, upon the pressure at said other control input exceeding the pressure at said one control input, fluid under pressure flows from said supply port to the other of said outputs,
   d. electroresponsive valve means operative to effect the supply of fluid under pressure to and the release of fluid under pressure from said brake-applying means to atmosphere, and e. a pair of fluid pressure responsive switch devices, one of which is responsive to fluid under pressure supplied thereto from said one output of one of said bistable fluid amplifiers to establish a first circuit to said electroresponsive valve means to cause the operation thereof to effect the supply of fluid under pressure to said brake-applying means and the other of which is responsive to fluid under pressure supplied thereto from the other of said outputs of the other of said bistable fluid amplifiers to establish a second circuit to said electroresponsive valve means to cause the operation thereof to effect the release of fluid under pressure from said brake-applying means to atmosphere.

10. In a multiple-locomotive brake control system for a train of cars, the combination as claimed in claim 5, further characterized by:

a. first valve means manually operative to cut out operation of said first pair of bistable fluid pressure amplifiers and render said regulating valve means operative to control the supply of fluid under pressure to said equalizing reservoir and the release of fluid under pressure from the reservoir to atmosphere, and by b. second valve means manually operative to cut out operation of said second pair of bistable fluid pressure amplifiers and render said self-lapping valve means of said independent brake valve operative to control the supply of fluid under pressure to and the release of fluid under pressure from said brake-applying means to atmosphere.